(12) United States Patent
Gonikberg et al.

(10) Patent No.: US 8,238,292 B2
(45) Date of Patent: *Aug. 7, 2012

(54) COOPERATIVE TRANSCEIVING BETWEEN WIRELESS INTERFACE DEVICES OF A HOST DEVICE WITH SHARED MODULES

(75) Inventors: Mark Gonikberg, Los Altos Hills, CA (US); Prasanna Desai, Elfin Forest, CA (US); Brima B. Ibrahim, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/305,233

(22) Filed: Nov. 28, 2011

(65) Prior Publication Data

US 2012/0106419 A1    May 3, 2012

Related U.S. Application Data

(63) Continuation of application No. 12/882,670, filed on Sep. 15, 2010, now Pat. No. 8,089,922, which is a continuation of application No. 11/801,534, filed on May 10, 2007, now Pat. No. 7,826,411.

(51) Int. Cl.
*G06F 15/18* (2006.01)

(52) U.S. Cl. ........................ 370/328; 370/338

(58) Field of Classification Search ............... 455/414.3, 455/456.1; 370/235, 276, 311, 328, 338, 370/402
See application file for complete search history.

(56) References Cited

U.S. PATENT DOCUMENTS

2008/0205274 A1*  8/2008  Welborn .................... 370/235
* cited by examiner

*Primary Examiner* — Sam Bhattacharya
(74) *Attorney, Agent, or Firm* — Garlick & Markison; Bruce E. Stuckman

(57) ABSTRACT

A circuit includes a first wireless interface circuit that transceives packetized data between a host module and a first external device in accordance with a first wireless communication protocol, wherein the first wireless protocol carries wireless telephony data for communication with a wireless telephony network. A second wireless interface circuit transceives packetized data between the host module and a second external device in accordance with a second wireless communication protocol. The second wireless interface circuit includes at least one module that is shared with first wireless interface circuit. The first wireless interface circuit and the second wireless interface circuit operate in accordance with a wireless interface schedule that includes a first time interval where the first wireless interface device and the second wireless interface device contemporaneously use the at least one module.

16 Claims, 12 Drawing Sheets antenna section 61

COOPERATIVE TRANSCEIVING BETWEEN WIRELESS INTERFACE DEVICES OF A HOST DEVICE WITH SHARED MODULES

CROSS-REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/882,670, entitled "COOPERATIVE TRANSCEIVING BETWEEN WIRELESS INTERFACE DEVICES OF A HOST DEVICE WITH SHARED MODULES," filed Sep. 15, 2010, now U.S. Pat. No. 8,089,922.
    a. Ser. No. 12/882,670 claims priority under 35 U.S.C. 120 as a continuation of U.S. Utility application Ser. No. 11/801,534, entitled COOPERATIVE TRANSCEIVING BETWEEN WIRELESS INTERFACE DEVICES OF A HOST DEVICE WITH SHARED MODULES, filed on May 10, 2007, issued Nov. 2, 2010 as U.S. Pat. No. 7,826,411, the contents of which are incorporated herein by reference thereto.

BACKGROUND OF THE INVENTION

1. Technical Field of the Invention

This invention relates generally to wireless communication systems and more particularly to cooperative transceiving by wireless interface devices of the same host device.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etcetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

The 2.4 GHz industrial, scientific and medical (ISM) band is experiencing unprecedented growth due mostly to strong showing of two wireless technologies: wireless local area networking (WLAN) and wireless personal area networking (WPAN). WLAN operates in the 100+ meters range and is usually used to augment traditional wired networking by providing wireless connectivity in the home, office or public areas. WLAN devices operate in accordance with IEEE 802.11 standards (802.11b, 802.11g and 802.11n) and offer data rates in excess of 100 Mbps. In recent years as the voice over IP (VoIP) finds wider adoption for carrying telephone traffic, various new concepts such as Unlicensed Mobile Access (UMA) have been using WLAN as a technology of choice for the wireless terminals.

The WPAN technology is led by Bluetooth that has been designed as a cable replacement technology to provide device interconnection in the radius of approximately 10 meters. The Bluetooth network is organized as a piconet with a single master device and a number of slave devices which are only allowed to communicate with the master. In this scheme a single slave device selected by the master may transmit while others must wait for their turn. The Bluetooth physical layer (PHY) uses frequency hopping spread spectrum (FHSS) technology. At any point in time Bluetooth signal occupies just 1 MHz of bandwidth but the center frequency changes up to 1600 times per second. The frequency change (hopping) pattern is selected by the piconet master such that the interference between different piconets is minimized. A time-division duplex (TDD) technique is used to transmit and receive data in a piconet. The transmission channel is divided into 625 us slots. Piconet master transmits during even-numbered slots while the slave devices transmit during odd-numbered slots. The specification also allows multislot transmissions where packets occupy multiple consecutive slots (three or five). A slave must respond to the master's packet addressed to it. If it has no data it must respond with a NULL packet. The Bluetooth specification defines the following types of links for the support of voice and data applications: synchronous connection-oriented (SCO), extended synchronous (eSCO) and asynchronous connectionless (ACL). SCO and eSCO links are typically used for transmitting real-time voice and multimedia packets while ACL is most often used for non-real time data traffic. The SCO packets do not have cyclic redundancy check (CRC) protection and are never retransmitted. eSCO and ACL packets use CRC and errors are corrected by packet retransmission. The most typical Bluetooth application is found in the wireless headsets.

WLAN technologies are lead by IEEE 802.11 that defines two different ways to configure a wireless network: ad hoc mode and infrastructure mode. In ad hoc mode, nodes are brought together to form a network on the fly, whereas infrastructure mode uses fixed access points (AP) through which mobile nodes can communicate. These network access points are usually connected to wired networks through bridging or routing functions.

The WLAN medium access control (MAC) layer is a contention-resolution protocol that is responsible for maintaining order in the use of a shared wireless medium. IEEE 802.11 specifies both contention-based and contention-free channel access mechanisms. The contention-based scheme is also called the distributed coordination function (DCF) and the contention free scheme is also called the point coordination function (PCF). The DCF employs a carrier sense multiple access with collision avoidance (CSMA/CA) protocol. In this protocol, when the WLAN MAC receives a packet to be transmitted from its higher layer, the MAC first listens to ensure that no other node is transmitting. If the channel is clear, it then transmits the packet. Otherwise, it chooses a random backoff factor that determines the amount of time the node must wait until it is allowed to transmit its packet. During periods in which the channel is clear, the WLAN MAC waiting to transmit decrements its backoff counter, and when the channel is busy, it does not decrement its backoff counter. When the backoff counter reaches zero, the WLAN MAC transmits the packet. Because the probability that two nodes will choose the same backoff factor is low, collisions between packets are minimized. Collision detection, as employed in Ethernet, cannot be used for the radio frequency transmissions of devices following IEEE 802.11. The IEEE 802.11 nodes are half-duplex—when a node is transmitting, it cannot hear any other node in the system that is transmitting because its own signal drowns out any others arriving at the node.

Optionally, when a packet is to be transmitted, the transmitting node can first send out a short request to send (RTS) packet containing information on the length of the packet. If the receiving node hears the RTS, it responds with a short clear to send (CTS) packet. After this exchange, the transmitting node sends its packet. If the packet is addressed to a single recipient (directed packet) is received successfully, as determined by a cyclic redundancy check (CRC), the receiving node transmits an acknowledgment (ACK) packet. If the transmitting node does not receive an ACK for the directed packet it assumes that the packet transmission had failed and error recovery is attempted by retrying the original packet. Retries are continued until either the ACK packet is received or the retry limit is reached. In the later case the packet is retried at a lower data rate and if that fails the packet is discarded.

To maintain a reliable data connection at the highest possible data rate the WLAN transmitter usually employs dynamic rate adaptation algorithm. Such algorithm reduces the data rate for wireless communication when number of unsuccessful attempts to transmit a packet reaches a certain threshold. In an environment where the thermal noise is the only source of receive errors this algorithm converges to the highest data rate supported by the wireless link. However for the cases where transmission failed due to the interference from a Bluetooth transceiver collocated with the receiving node this rate adaptation algorithm would result in lowering the data rate, increasing the packet transmission time and thus further increasing the probability of the interference errors.

When the packet is lost the overall network performance is affected. The impact is dependent on the type of packets. Discarding directed frames might result in poor voice quality in VoIP link or lower TCP throughput. If a wireless station fails to receive multicast packets might result is failures in such protocols as ARP and DHCP. Loosing beacon frames might result in loss of synchronization to the wireless network.

As WLAN and WPAN are designed for different uses they often complement each other in personal computers and mobile devices such as phones and personal digital assistants. And while these two wireless systems use different technologies they operate in the same 2.4 GHz ISM band and as a result interfere with each other. The problem of Bluetooth interfering with WLAN is particularly serious when these two technologies are implemented on a single chip and share some of the radio components. Such interference might cause degraded data throughput, reduced voice quality or even link disconnection.

The interference between WLAN and WPAN networks can be divided into two classes. The interference is said to be external if the interfering devices are physically separated by a distance of more than two meters. The interference is said to be internal if the devices are located at a distance of less than two meters and devices are said to be collocated. The internal interference is much more severe as each wireless transceiver has drastic impact on the performance of the other, as it's transmit/receive activity may saturate the LNA of the other device.

The mutual interference between BT and WLAN depends on several factors. The physical distance between BT and WLAN, the operating data rate, operating transmit power levels and amount of data all affect the interference. To address the problem of mutual interference between 802.11 WLAN and Bluetooth technologies IEEE has developed 802.15.2 Recommended Practice that offers several coexistence mechanisms to enable WLAN and Bluetooth to operate in a shared environment without adversely affecting each others performance. The IEEE 802.15.2 Recommended Practice categorizes coexistence mechanisms into two classes: collaborative and non-collaborative. The former is applicable to collocated WLAN and Bluetooth and requires exchange of information between these two devices, while the later does not require information sharing.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

The following abbreviations are presented for clarity:

| | |
|---|---|
| A2DP | Advanced Audio Distribution Profile |
| AP | Access Point |
| ACK | Acknowledgement |
| ACL | Asynchronous Connectionless |
| AM | Active Mode |
| AWMA | Alternating Wireless Medium Access |
| AFH | Adaptive Frequency Hopping |
| BT | Bluetooth |
| BPF | Band Pass Filter |
| BSS | Basic Service Set |
| CRC | Cyclic Redundancy Check |
| CS | Carrier Sense |
| CSMA/CA | Carrier Sense Multiple Access with Collision Avoidance |
| CTS | Clear To Send |
| DCF | Distributed Coordination Function |
| DTIM | Delivery Traffic Indication Map |
| ECI | Enhanced Coexistence Interface |
| EDR | Extended Data Rate |
| eSCO | Enhanced Synchronous Connection Oriented |
| FHSS | Frequency Hopping Spread Spectrum |
| FTP | File Transfer Protocol |
| IBSS | Independent Basic Service Set |
| IGMP | Internet Group Management Protocol |
| ISM | Industrial, Scientific and Medical |
| LNA | Low Noise Amplifier |
| MAC | Medium Access Control |
| NAV | Network Allocation Vector |
| PA | Power Amplifier |
| PCF | Point Coordination Function |
| PER | Packet Error Rate |
| PHY | Physical layer |
| PTA | Packet Transmit Arbitration |
| PS | Power Save |
| RSSI | Received Signal Strength Indicator |
| RTS | Request To Send |
| RX | Receive |
| SCO | Synchronous Connection Oriented |
| STA | Station |
| SIFS | Short Inter Frame Space |
| TDD | Time-Division Duplex |
| TDMA | Time-Division Multiple Access |
| TSSI | Transmit Signal Strength Indicator |
| TPC | Transmit Power Control |
| TX | Transmit |
| UMA | Unlicensed Mobile Access |
| VoIP | Voice over IP |
| VoWLAN | Voice over WLAN |
| WLAN | Wireless Local Area Network |
| WPAN | Wireless Personal Area Network |

Figure 1:
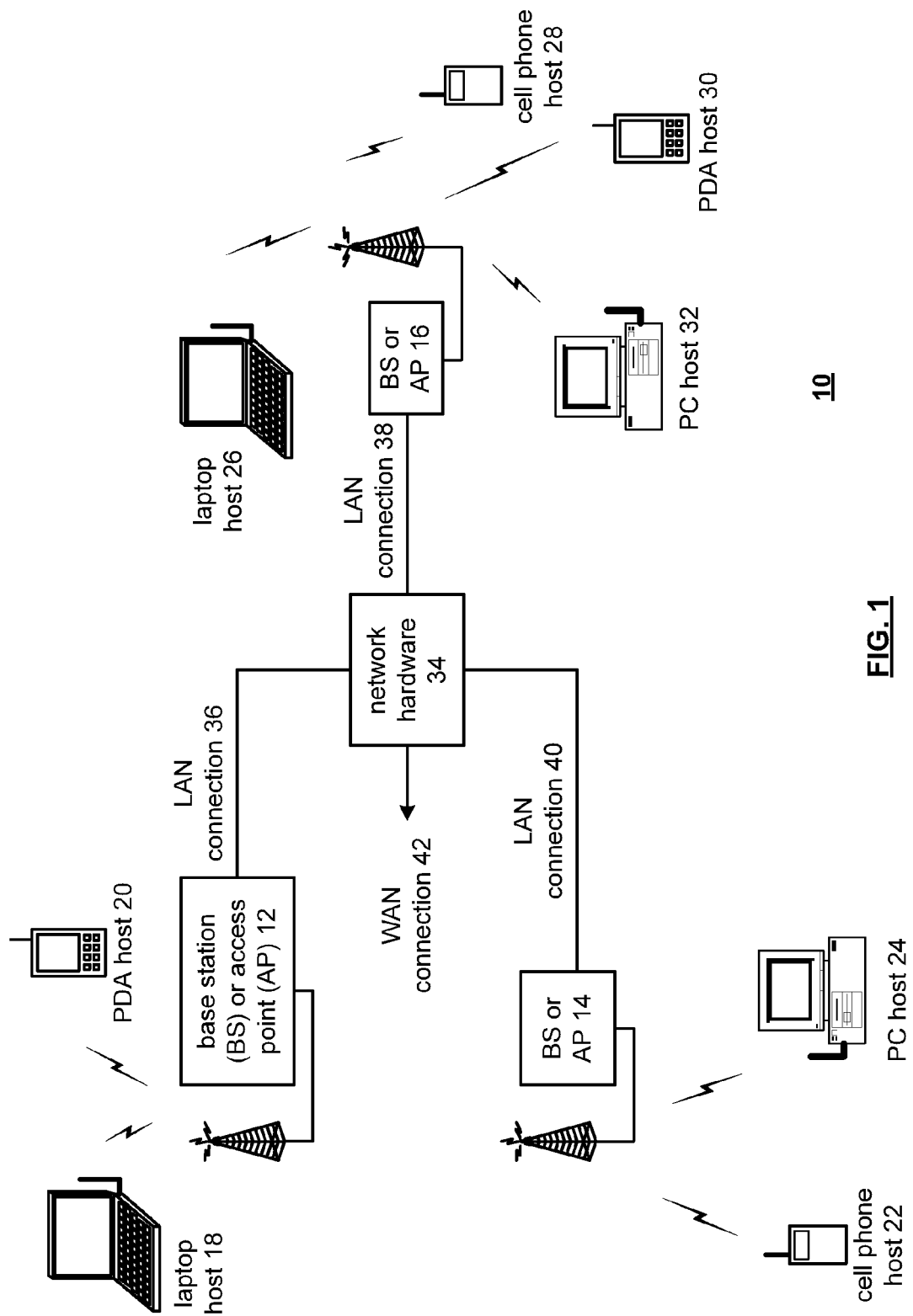
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32, cellular telephone hosts 22 and 28 and/or other wireless devices.

The base stations or access points 12-16 are operably coupled to the network hardware 34 via local area network connections 36, 38 and 40. The network hardware 34, which may be a router, switch, bridge, modem, system controller, etcetera, provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

In an embodiment of the present invention, one or more of the communication devices 18, 20, 22, 24, 26, 28, 30 and 32 operates over an additional wireless network, such as a wireless personal area network, that shares the same spectrum or otherwise could potentially interfere with wireless communication between the base stations or access points 12, 14 and 16 and the wireless communication devices 18, 20, 22, 24, 26, 28, 30 and 32. For example, the base stations or access points 12, 14 and 16 could operate in accordance with a wireless local area network protocol such as an 802.11 protocol and one or more wireless communication devices 18, 20, 22, 24, 26, 28, 30 and 32 can be Bluetooth-enabled. In this case, WLAN and Bluetooth communications could both use the 2.4 GHz frequency band. For instance, the laptop host 18 may communicate via Bluetooth technology with a keyboard, a mouse, a printer, a mobile phone, a PDA, and/or a set of headphones or speakers, where these devices and the laptop host 18 may form an ad-hoc Bluetooth piconet. Generally, a Bluetooth piconet may comprise a master device or terminal and up to seven slave devices or terminals. In this exemplary implementation, the laptop host 18 may correspond to the master Bluetooth terminal and the peripheral devices 114 may correspond to the slave Bluetooth terminals. Similarly, cell phone host 22 could communicate via Bluetooth technology with a Bluetooth headset and place wireless telephone calls via a base station of wireless IP telephone calls via an access point or base station.

The present invention is directed to power savings associated with the operation of two or more transceivers in a single device. In addition, the wireless communication devices 18, 20, 22, 24, 26, 28, 30 can include one or more features of the present invention addressing coexistence issues that will be described in greater detail with reference to FIGS. 2-18. Examples of such coexistence issues include the following.

Concurrent WLAN and Bluetooth Data Connections

In this set of use cases, Bluetooth uses ACL link to move data to and from the collocated device while WLAN is active. The performance is measured in terms of throughput for each of the wireless interfaces. The following configuration permutations can be addressed:
  Collocated Bluetooth device being master or slave;
  Collocated Bluetooth device is uploading/downloading data;
  Collocated WLAN device is uploading, downloading or providing bi-directional data traffic at different data rates;
  Collocated WLAN device is performing channel scan or periodic radio calibration.

These use cases are most forgiving as both Bluetooth ACL and WLAN support packet error detection and retransmission.

Concurrent Bluetooth Voice and WLAN Data Connections

In these use cases, Bluetooth uses SCO or eSCO link to send high quality voice to the wireless headset while WLAN transfers data. The Bluetooth data is usually limited to 64 Kbps in both directions and its performance is measured in terms of packet error rate (PER) or voice quality score such as ITU-T P.862 (PESQ) [6]. The WLAN performance is measured in terms of throughput. The following configuration permutations can be addressed:
  Collocated Bluetooth device being master or slave;
  Collocated Bluetooth device uses SCO packets (HV1, HV3);
  Collocated Bluetooth device uses eSCO packets (EV1, EV3, EV4, EV5, 2EV3, 2EV5, 3EV3, 3EV5);
  Collocated WLAN device is uploading, downloading or providing bi-directional data traffic at different data rates;
  Collocated WLAN device is performing channel scan or periodic radio calibration.

Concurrent Bluetooth High Quality Audio Streaming and WLAN Data Connection

The Bluetooth Advanced Audio Distribution Profile (A2DP) specifies the protocols and procedures that realize distribution of audio content of high-quality in mono or stereo on Bluetooth ACL channels. It defines various audio codec setting with resulting maximum data rate of 320 Kbps for mono and 512 Kbps for two channel devices. This use case is different from Bluetooth data as the maximum jitter and the minimum throughput requirements must be met for the Bluetooth device to avoid audio quality deterioration. The following configuration permutations can be addressed:
  Collocated Bluetooth device being master or slave;
  Collocated Bluetooth device is sending or receiving audio stream;
  Collocated WLAN device is uploading, downloading or providing bi-directional data traffic at different data rates;
  Collocated WLAN device is performing channel scan or periodic radio calibration.

Concurrent Bluetooth Scan and WLAN Data Connection

In these use cases Bluetooth device performs or receives inquiry or page scan while the WLAN transfers data. The following configuration permutations can be addressed:
  Collocated Bluetooth device is in page or inquiry state;
  Collocated Bluetooth device is performing page or inquiry scan;
  Collocated WLAN device is uploading, downloading or providing bi-directional data traffic at different data rates;
  Collocated WLAN device is performing channel scan or periodic radio calibration.

For these cases, it is desirable for the Bluetooth scan to succeed with minimum impact on WLAN throughput, scan or calibration results.

Concurrent Voice Over WLAN (VoWLAN) and Bluetooth Voice Traffic

In these use cases, WLAN serves as a bridge between VoIP internet traffic and WLAN enabled phone while Bluetooth is used to enable wireless headset. The VoIP packets are usually contain 20 ms worth of compressed voice and depending on the voice codec type are 20-160 bytes in size (not counting various protocol overheads). These WLAN packets are delivered once pr 20 ms to ensure uninterrupted voice stream. For these usage cases both WLAN and Bluetooth performance is measured in terms of packet error rate and P.862 voice quality score. In addition as WLAN packets can be delayed packet jitter is also an important metric in judging VoWLAN system performance. The following configuration permutations can be addressed:
  Collocated Bluetooth device being master or slave;
  Collocated Bluetooth device uses SCO packets (HV1, HV3);
  Collocated Bluetooth device uses eSCO packets (EV1, EV3, EV4, EV5, 2EV3, 2EV5, 3EV3, 3EV5);
  Collocated Bluetooth device is in page or inquiry state;
  Collocated Bluetooth device is performing page or inquiry scan;
  Collocated WLAN device is supporting bi-directional VoWLAN traffic at different data rates;
  Collocated WLAN device is performing channel scan or periodic radio calibration.

Video and Audio Streaming Over WLAN with Concurrent High Quality Audio Bluetooth Connection In these use cases, the WLAN interface is used for streaming real-time video and audio data to the mobile device and Bluetooth is used for providing high quality audio connection to the stereo headphones. These are one of the most challenging use cases due to the real-time nature of the multimedia traffic on both interfaces and the high data rates employed. The following configuration permutations must be addressed:
  Collocated Bluetooth device being master or slave;
  Collocated Bluetooth device uses SCO packets (HV1, HV3);
  Collocated Bluetooth device uses eSCO packets (EV1, EV3, EV4, EV5, 2EV3, 2EV5, 3EV3, 3EV5);
  Collocated Bluetooth device uses ACL with various packet types;
  Collocated Bluetooth device is in page or inquiry state;
  Collocated Bluetooth device is performing page or inquiry scan;
  Collocated WLAN device is supporting one channel of video and up to two channels of audio at different data rates.

In addition, other coexistence issues can exist in other scenarios and with other transceivers that operate in accordance with other wireless communication protocols. The discussion above is meant to be illustrative of the type of issues that can be faced by such devices and not an exhaustive list of all coexistence issues that can be addressed within the broad scope of the present invention.

Figure 2:
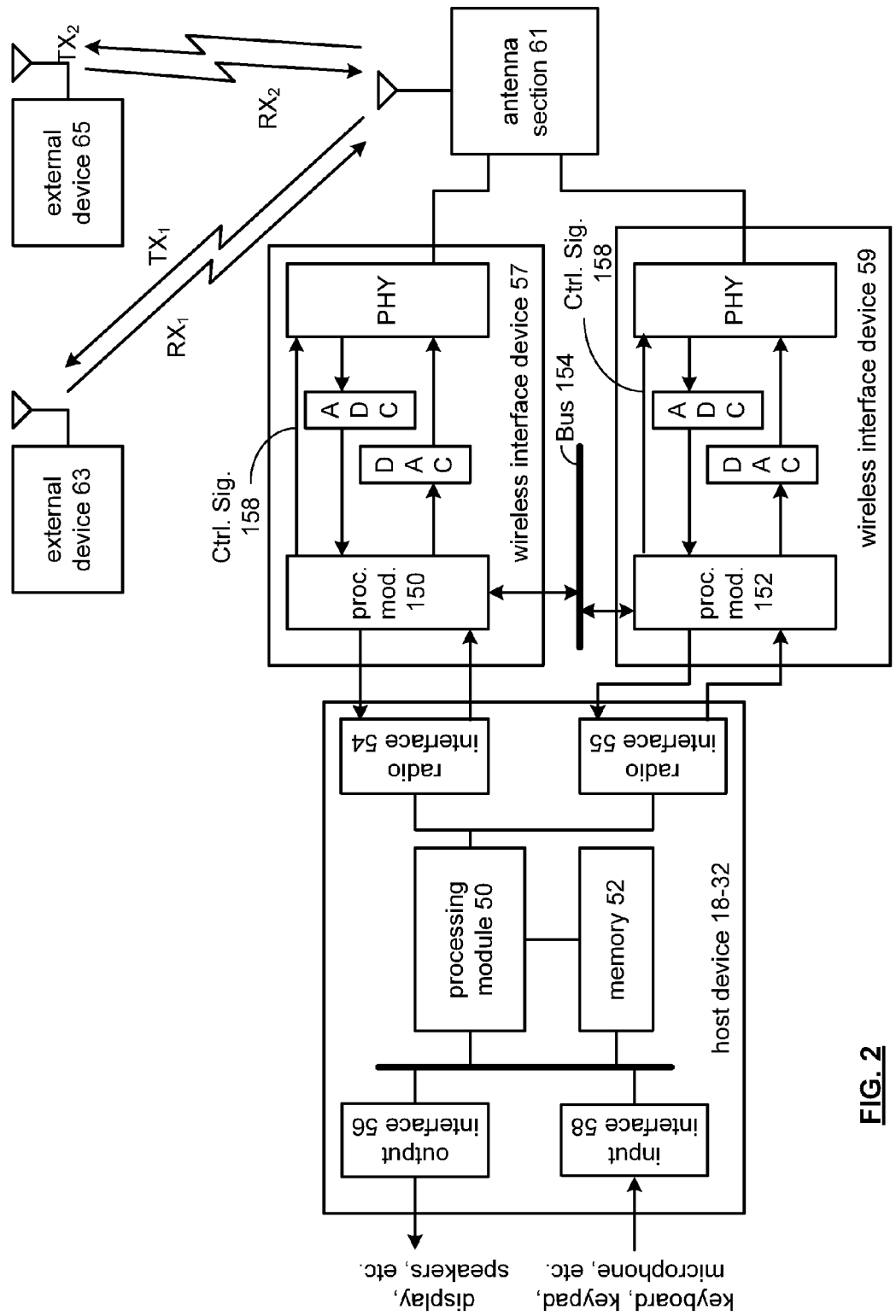
FIG. 2 is a schematic block diagram of a wireless communication device in accordance with an embodiment of the present invention.

FIG. 2 is a schematic block diagram illustrating a wireless communication device that includes the host device, or module, 18-32 and at least two wireless interface devices, or radio transceivers, 57 and 59. The wireless interface devices can be wireless interface circuits that are implemented separately or with a single integrated circuits, built in components of the host device 18, 20, 22, 24, 26 28 30 or 32 (18-32), externally coupled components or part of a common integrated circuit that includes host device 18-32 and wireless interface devices 57 & 59. As illustrated, the host device 18-32 includes a processing module 50, memory 52, radio interfaces 54 and 55, input interface 58 and output interface 56. The processing module 50 and memory 52 execute the corresponding instructions that are typically performed by the host device. For example, for a cellular telephone host device, the processing module 50 performs the corresponding communication functions in accordance with a particular cellular telephone standard.

The radio interfaces 54 and 55 each communicate with a processing module 150 or 152 of the corresponding wireless interface device 57 or 59. These processing modules include a media-specific access control protocol (MAC) layer module and other processing functionality to support the features and functions of the particular wireless protocol employed by the wireless access device and further to perform additional functions and features of the present invention as described herein. The processing modules 150 and 152 may be implemented using a shared processing device, individual processing devices, or a plurality of processing devices.

The wireless interface devices 57 and 59 further include an digital-to-analog converter (DAC), an analog to digital converter (ADC), and a physical layer module (PHY). The radio interfaces 54 and 55 allow data to be received from and sent to external devices 63 and 65 via the wireless interface devices 57 and 59. Each of the external devices includes its own wireless interface device for communicating with the wireless interface device of the host device. For example, the host device may be personal or laptop computer, the external device 63 may be a headset, personal digital assistant, cellular telephone, printer, fax machine, joystick, keyboard, or desktop telephone, and the second external device 65 may be an access point of a wireless local area network. In this example, the external device 63 would include a Bluetooth wireless interface device, external device 65 would include an IEEE 802.11 wireless interface device, and the computer would include both types of wireless interface devices.

For data received from one of the wireless interface devices 57 or 59 (e.g., inbound data), the radio interface 54 or 55 provides the data to the processing module 50 for further processing and/or routing to the output interface 56. The output interface 56 provides connectivity to an output display device such as a display, monitor, speakers, et cetera such that the received data may be displayed. The radio interfaces 54 and 55 also provide data from the processing module 50 to the wireless interface devices 57 and 59. The processing module 50 may receive the outbound data from an input device such as a keyboard, keypad, microphone, etcetera via the input interface 58 or generate the data itself. For data received via the input interface 58, the processing module 50 may perform a corresponding host function on the data and/or route it to one of the wireless interface devices 57 or 59 via the corresponding radio interface 54 or 55.

In operation, to mitigate interference between the two or more wireless interface devices 57 and 59 of the wireless communication device, the processing modules 150 and 152 of each wireless interface device 57 and 59 communicate with each other via a high speed data bus such as bus 154, to coordinate their activities. In particular, bus 154 bidirectionally communicates cooperation data between the wireless interface devices 57 and 59, wherein the cooperation data relates to cooperate transceiving in a similar, and/or otherwise interfering or common frequency spectrum.

Consider, for example, the application where one of the wireless interface devices transceive data packets in accordance with a Bluetooth standard while the other wireless interface devices transceives data packets in accordance with an IEEE 802.11 standard. One of the wireless interface devices 57 or 59 can provide cooperation data such as an indication of receiving an inbound packet to another one of the wireless interface devices. The other wireless interface device processes the indication and transmits an outbound packet in accordance with the processing of the indication. For example, the processing may be performed to determine when the first wireless interface device is receiving the inbound packet. If so, the other wireless interface device may delay transmitting the outbound packet until the one of the wireless interface devices has received the inbound packet. Note that, to minimize the time that one wireless interface device is receiving packets, and hence reduce the wait time, the packet size of inbound packets and outbound packets may be optimized in accordance with the particular wireless communication standard. As a further example, the processing of the indication may be to determine whether the transmitting of the outbound packet would interfere with the receiving of the inbound packet. If so, the other wireless interface device may delay transmitting the outbound packet until the one of the wireless interface devices has received the inbound packet. If the transmitting of the outbound packet would not interfere with the receiving of the inbound packet, the other wireless interface device transmits the outbound packet while the inbound packet is being received. Note that to reduce interference, the wireless interface device that is compliant with the Bluetooth standard may adaptively adjust its frequency hopping sequence to reduce interference with the other wireless interface device.

Further, the wireless interface devices 57 and 59 can operate to exchange cooperation data in the form of status messages regarding transmission and reception of packets. Note that a status message may be provided in response to a request from the other wireless communication device for a particular piece of information, for a full status report, or any portion thereof and each of the wireless interface devices transmits an outbound packet in accordance with the processing of the received status messages.

In one example of the processing of the status message and transmitting of the outbound packet, the wireless interface device determines that the other wireless interface device is currently receiving an inbound packet. In this situation, the wireless interface device may delay transmitting of the outbound packet until the other wireless interface device has received the inbound packet.

In another example of the processing of the status message and transmitting of the outbound packet, the wireless interface device determines that the other wireless interface device is expecting to receive an inbound packet. In this situation, the wireless interface device may delay transmitting of the outbound packet until the other wireless interface device has received the inbound packet unless the delay would cause an interrupt for low latency real time transmissions.

In yet another example of the processing of the status message and transmitting of the outbound packet, the wireless interface device determines that the other wireless interface device is transmitting an outbound message. In this situation, the wireless interface device may delay transmitting of the outbound packet until the other wireless interface device has transmitted the inbound packet unless interference would be minimal or if a delay would cause an interrupt for low latency real time transmissions.

In a further example of the processing of the status message and transmitting of the outbound packet, the wireless interface device determines that the other wireless interface device is expecting to transmit another outbound message. In this situation, the wireless interface device randomizes the delay in transmitting the outbound packet in accordance with a random transmission protocol. For example, each wireless interface device may be assigned a unique wait period when they detect that two or more wireless interface devices desire to transmit a packet at about the same time.

In an additional example, one of the wireless interface devices 57 or 59 determines whether a second wireless interface device is transmitting an outbound packet based on information shared over the bus 154. If the other wireless interface device is not transmitting, the wireless interface device transmits its packet. If, however, the other wireless interface device is transmitting a second outbound packet, the wireless interface device determines whether transmitting its outbound packet would interfere with the transmitting of the second outbound packet. This may be done by comparing the transmit power level of the first wireless interface device with the transmit power level of the second wireless interface device. If they are similar and relatively low, the interference may be minimal. If, however, there would be sufficient interference, the wireless interface device delays transmitting the first outbound packet until the second outbound packet has been transmitted.

Also, cooperation data can include a sleep status indicator that is asserted when a WLAN wireless interface device in idle mode wakes up to listen for beacon and is deasserted when it goes to sleep. This can be used for synchronizing Bluetooth scan activities with the STA listening for and receiving beacons when both Bluetooth as well as the STA are otherwise in standby mode, thus improving power consumption in that mode. For instance, Bluetooth would timestamp the instants when beacon listening commences and ends and accordingly schedule page and inquiry scans to overlap.

It should be noted that implementation of bus 154 as a high-speed data bus allows cooperation data to be shared between wireless interface devices 57 and 59 on a packet by packet basis. In particular, the bus 154 can bidirectionally communicate cooperation data between the processing modules 150 and 152 and the second processing module for each transmitted or received packet of either wireless interface device 57 and/or 59. Cooperation data can further include channel data, such as a channel number that identifies a selected one of a plurality of channels, a master/slave indicator, a signal strength indicator, an antenna status indicator, a transmit power level indicator, a current hop frequency, a future hop frequency, a slot hop time, and a frequency hop sequence, a voice activity detection status indicator, a transmit timing parameter, a receive timing parameter, delivery traffic indication message (DTIM) interval indicator, a station idle mode indicator, and/or other data.

In accordance with one mode of operation, the processing modules 150 and 152 are implemented with separate processing devices that primarily perform processing on the packetized data from their own respective wireless interface devices, but are operable to perform tasks for the other processing module. In particular, each processing module is operable to assign a processing task relating to the processing of its own packetized data to the other processing module, via task information communicated via the bus 154 or by other means. This task information can include a task assignment that identifies a task to be performed, a task priority that corresponds to the assigned task, and a plurality of task data to be processed by the other processing module. Further the task information can include a plurality of results data generated by the other processing module in response to the task data and optionally other control data.

In an embodiment of the present invention, the processing task can be to compress or decompress data in accordance with a JPEG, MPEG, MP3 or other audio, video image or data compression standard or algorithm, to encrypt or decrypt data in accordance with one or more encryption algorithms or to perform other data processing. For instance, a processing module associated with a Bluetooth wireless interface device can perform encryption processing or other security operations for a WLAN wireless interface device in response to receiving a task assignment via the bus 154 that identifies the particular security operation and task data that includes the data to be encrypted. When the Bluetooth processing module has completed the task, the resulting data can be transferred back to the WLAN processing module as results data via the bus 154 for use by the WLAN processor in processing its own packetized data.

In addition, task information can include a task identifier and task priority that pertains to the task currently being performed by each processing module 150, 152. For instance, should a processing module 150 or 152 be performing a high priority realtime task for a period of time, the other processor may determine not to assign a processing task during this period of time.

In an embodiment, wireless interface devices 57 and 59 are implemented with one or more shared modules that are operational in a first state, and yet can placed in a low-power state that reduces the power consumption of the module or shuts off the module in order to conserve power. Examples of such a shared module include a low noise amplifier, an oscillator such as a crystal oscillator or other oscillator circuit, a memory, a processing module or other module that can be used by both the wireless interface devices 57 and 59 in operation and switched to the low power state when not in use in order to conserve power. In one mode of operation, cooperation data is shared between the wireless interface devices 57 and 59 relating to cooperate use of the at least one module.

In a mode of operation, the switching of the shared modules between operational states and low power states can be coordinated by cooperation data communicated via bus 154 or other signaling path. For instance, one wireless interface device can indicate that it is beginning to use a shared module, giving another wireless interface device the opportunity to use the shared device at the same time. Further, one wireless interface device can indicate that it has completed its use of a shared module but switch to a low power state if, via cooperation data, it is determined that the other wireless interface device has completed using or otherwise is not using the shared module.

In another example, activities that use the shared device can be coordinated by means of a wireless interface schedule so that uses of the shared module or modules is minimized. For instance, a wireless interface schedule can be stored in memory associated with processing module 150 and/or 152 that includes a first time interval wherein the first wireless interface device and the second wireless interface device contemporaneously use the at least one module in the first state and a second time interval wherein the at least one module is in the second state. In applications where the wireless interface device 57 operates in accordance with a wireless local area network protocol, such as an 802.11 protocol, and wireless interface device 59 operates in accordance with a wireless pico-net protocol such as a Bluetooth protocol, a time interval in the wireless interface schedule for wireless interface device 57 to scan for an incoming beacon from an access point, can also be used for receiving Bluetooth page scans via the wireless interface device 59. In particular, a low noise amplifier, oscillator or other shared module can be used simultaneously by the receivers of interface devices 57 and 59 to reduce the amount of time that these shared devices are powered and/or fully powered and therefore, to reduce power consumption.

In an embodiment of the present invention, a Bluetooth processing module (150 or 152) is included in a Bluetooth wireless interface device (57 or 59) with the other processing module being a WLAN processing module in a WLAN wireless interface device. The bus 154 includes a 96-bit parallel interface (including 64 firmware lines and 32 hardware lines) for communication from the Bluetooth processing module and the WLAN processing module and a 32-bit parallel interface for communication from the WLAN processing module to the Bluetooth processing module as follows:

64-Bit Bluetooth Firmware Lines
  (8 bits)—Current task id that represents the current task or packet type being processed.
  (1 bit)—Current Master/Slave role.
  (3 bits)—Multi-level priority. This can either be static based on the task id or configurable so that priorities can changed for different tasks or packet types on the fly.
  (8 bits)—Current transmit power level
  (8 bits)—Current RSSI (Real-time, signaled prior to every Bluetooth transaction).
  (1 bit)—Whether voice activity detection is being employed.
  (5 bits)—Selectable time from an active bit being asserted high until the time the WLAN power amp should be off.
  (30 bits) Reserved.
32-Bit Bluetooth Hardware Lines
  (7 bits) Upcoming slot hop frequency.
  (1 bit) Reset
  (24 bits) Reserved.
32-Bit WL Signal Lines
  (5 bits) WLAN channel number.
  (2 bits) Slot usage request to Bluetooth.
  (1 bit) Shared or dual antenna configuration indicator.
  (1 bit) Indication from WLAN to Bluetooth to force remote Bluetooth to transmit at remote Bluetooth's maximum transmit power possible to improve SINR at Bluetooth's receiver.
  (2 bits) DTIM interval (i.e. 100, 300, 500 ms, etc.)
  (1 bits) Indication from the STA that it is in idle mode, merely listening to beacons.
  (1 bits) Sleep status indicator
  (19 bits) Task information, including task assignment (2 bits), WLAN task data/results data (16 bits) and reserved.

The reserved data bits can be used to transfer other task information, including task assignment data, BT & WLAN task data/results data, other cooperation data including cooperation data relating to the cooperative use of one or more shared modules and/or other data. This example is illustrative of some of the many possible forms of cooperation data and task information that can be shared between wireless interface devices in accordance with an embodiment of the present invention. It should be noted that, while a Bluetooth and WLAN wireless interface devices 57 and 59 are contemplated in this particular example, other wireless interface devices could likewise be implemented such as GSM, general packet radio service (GPRS), enhanced data rates for global evolution (EDGE), universal mobile telecommunication system (UMTS), CDMA, TDMA, LMPS, or MMPS or other wireless interfaces using similar or other task information and cooperation data.

Figure 3:
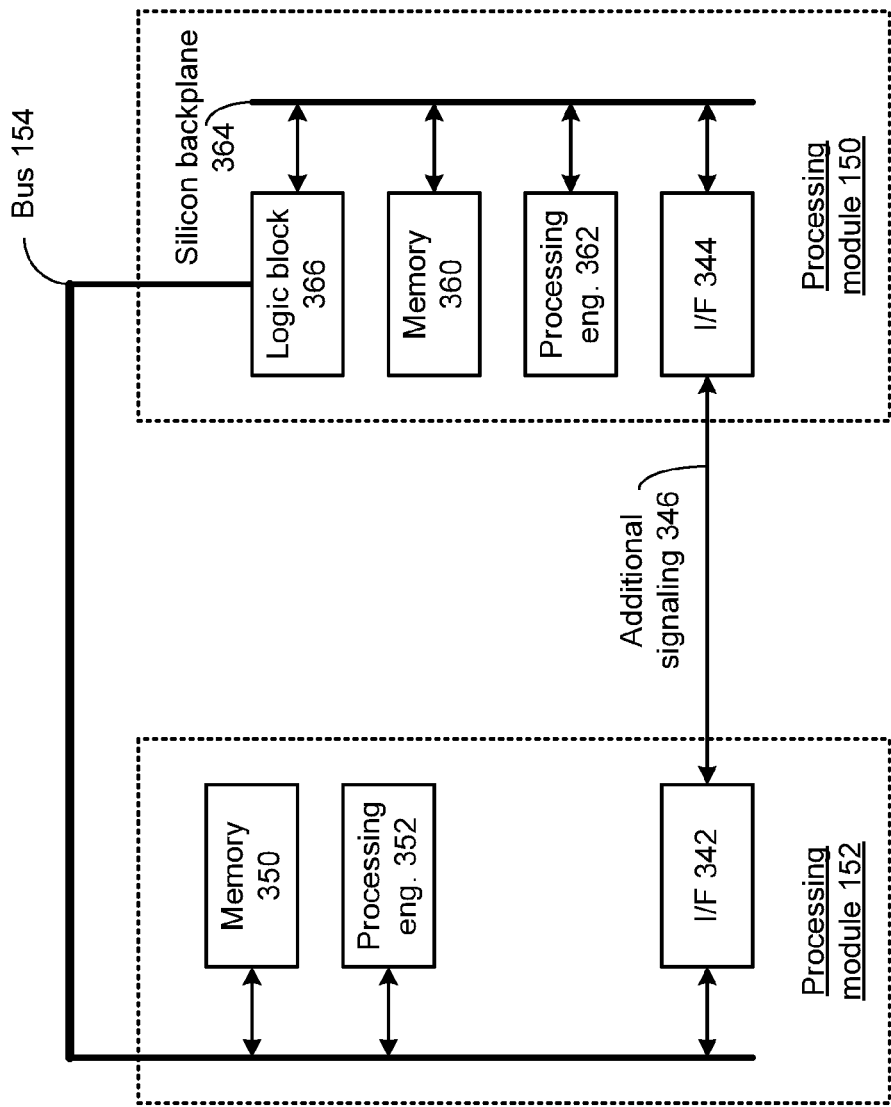
FIG. 3 is a schematic block diagram of processing modules 150 and 152 in accordance with an embodiment of the present invention.

FIG. 3 is a schematic block diagram of processing modules 150 and 152 in accordance with an embodiment of the present invention. In particular, processing module 152 includes memory 350, processing engine 352 and interface 342 that are coupled to bus 154. Processing module 150 includes a logic block 366 that couples bus 154 to silicon backplane 364, that is, in turn, coupled to memory 360, processing engine 362 and interface 344. Interfaces 342 and 344 optionally provide additional signaling 346 between the processing modules 150 and 152 that can be offloaded from the bus 154.

Processing engines 352 and 362 can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memories 350 and 360 can each may be a single memory device or a plurality of memory devices. Such a memory device may be a read-only memory, random access memory, volatile memory, non-volatile memory, static memory, dynamic memory, flash memory, and/or any device that stores digital information. Note that when the processing engines 352 and/or 362 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 4:
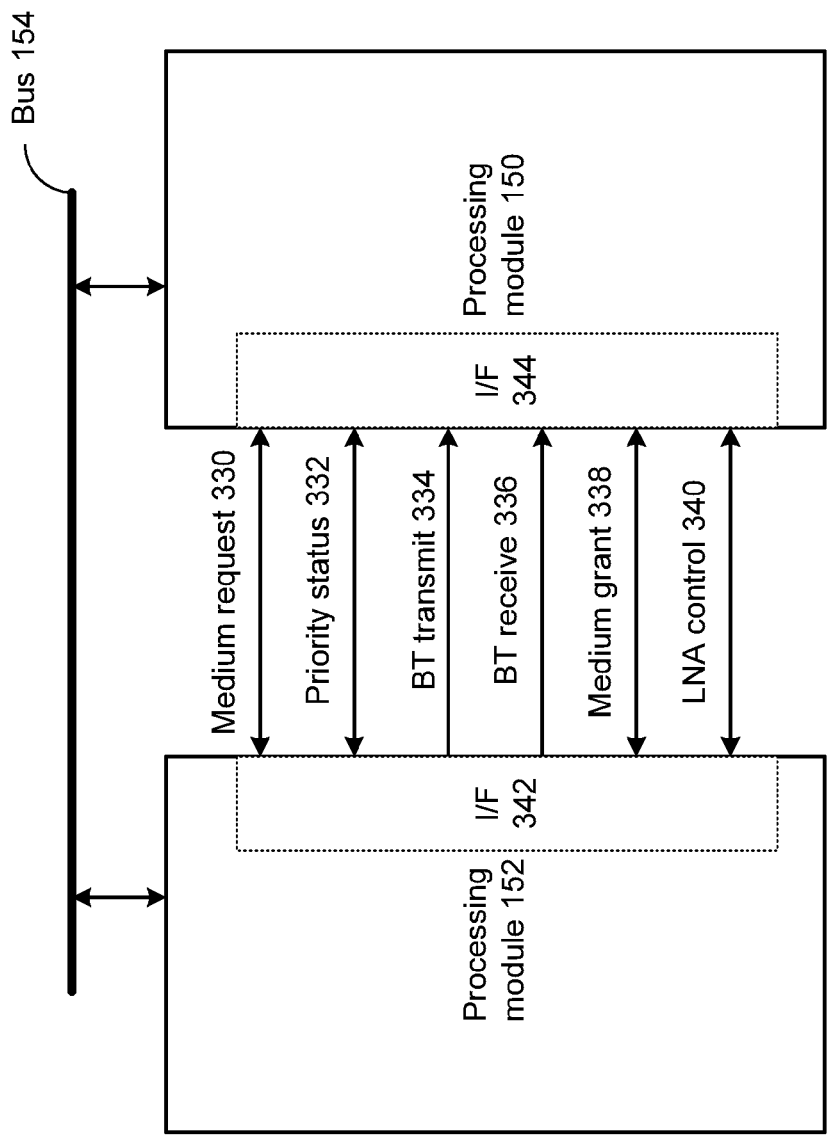
FIG. 4 is a schematic block diagram of processing modules 150 and 152 in accordance with an embodiment of the present invention.

FIG. 4 is a schematic block diagram of processing modules 150 and 152 in accordance with an embodiment of the present invention. In particular, additional signal lines 346 can be employed to provide additional cooperation data such as additional control and scheduling information between the wireless interface devices 57 and 59. These addition signals 346 can support IEEE 802.15.2 and/or provide additional signaling.

| Addt'l sig. 346 | Description |
| --- | --- |
| Medium Request 330 | Asserted to request to use the medium. |
| Priority status 332 | Signals Bluetooth priority status. |
| BT transmit 334 | Indicates that Bluetooth has started transmitting data |
| BT receive 336 | Indicates that Bluetooth has started receiving a valid frame |
| Medium grant 338 | Medium access confirmation; permission to receive or transmit. |
| RF controls 340 | Signals to control various RF switches including antenna switch, shared LNA gain, or other RF control |

In an embodiment of the present invention, Packet Transmit Arbitration (PTA) operates via the WLAN processing module 150 within MAC layer processing. The PTA provides per packet authorization of all transmissions talking place between collocated WLAN and Bluetooth devices. Bluetooth device requests medium access authorization from PTA, which may either allow or deny the requests depending on the status of the WLAN device. WLAN programs PTA into one of the following four settings:

PTA grants all Bluetooth medium requests;
PTA grants high priority Bluetooth requests only. (Priority status 332 is asserted at the time when medium request 330 is asserted);
PTA grants high and medium priority Bluetooth requests. (Priority status 332 signal is asserted or BT receive 336 signal is asserted at the time when medium request 330 is asserted);
PTA does not grant any Bluetooth medium requests.

The PTA setting can be changed dynamically by the WLAN processing module 150 device and can be configured to be dependent on the WLAN activity at the time of the request.

In an embodiment of the present invention, these signal lines can be bidirectional, particularly when shared coexistence decisions are made between processing modules 150 and 152.

While shown as separate signals lines, additional signaling 346 can be included in the cooperation data shared via bus 154, such as by utilizing one or more additional bits or by using one or more reserved bits. Alternatively these signals can be provided by other signal paths between the wireless interface devices 57 and 59. Other signaling, not shown, can likewise be included such as a restricted frequency indicator that is asserted when the wireless interface device 59 is about to transmit on a restricted channel.

Figure 5:
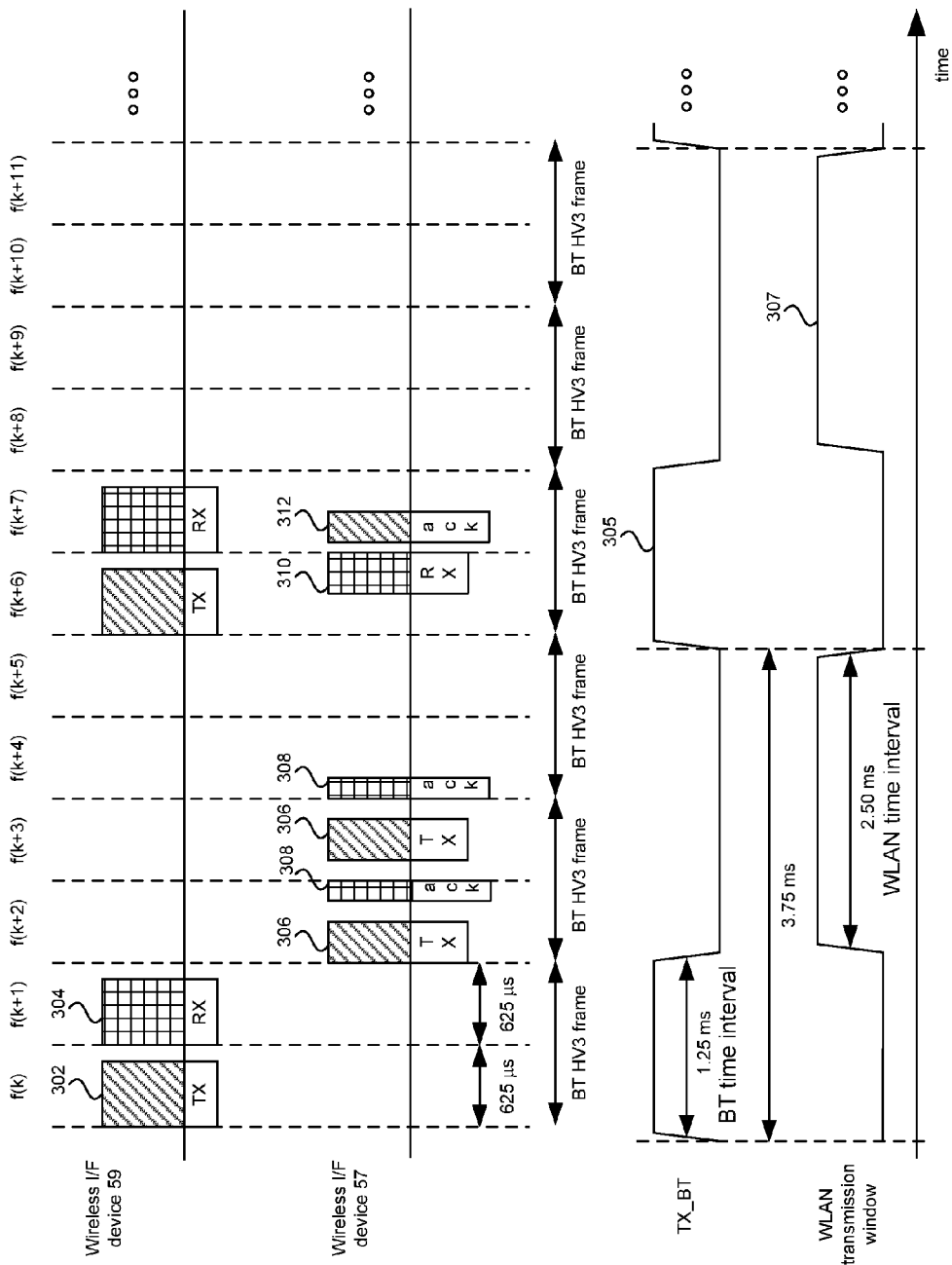
FIG. 5 is a timing diagram that illustrates an exemplary communication of BT HV3 frames and WLAN transmissions, in accordance with an embodiment of the invention.

FIG. 5 is a timing diagram that illustrates an exemplary communication of BT HV3 frames and WLAN transmissions, in accordance with an embodiment of the invention. In this embodiment, the wireless interface device 57 operates in accordance with a WLAN protocol such as 802.11(a), (b), (g) or (n) or another WLAN protocol and the wireless interface device 59 operates to communicate Bluetooth packets supported by the synchronous connection-oriented (SCO) logical transport protocol, such as Bluetooth (BT) HV3 packets. A BT HV3 packet may be generally used for 64 kb/s speech transmission but need not be so limited. The BT HV3 packet may comprise 30 information bytes with a payload length of 240 bits and no payload header present. The bytes are not protected by forward error correction (FEC) and no cyclic redundancy check (CRC) is present. Because retransmission of BT HV3 packets is not supported, when a BT HV3 packet is not received, the quality of the overall transmission is reduced since the information contained in the lost BT HV3 packet will not be retransmitted. As a result, BT HV3 packets may require a higher priority of transmission to avoid interference with WLAN transmission.

The transmission of a pair of BT HV3 packets between a station or terminal such as host device 18-32, and a peripheral device is referred to as a BT HV3 frame. In an embodiment of the present invention, the host device determines or is otherwise provided a wireless interface schedule that allocates communication to either the wireless interface devices 57 or 59 during the time slots f(i). For instance BT HV3 packet 302 may be transmitted from the host device to the peripheral device in time slot f(k) and a packet 304 may be transmitted from the peripheral device to the host device in time slot f(k+1). A time slot in Bluetooth communication is 625 μs is in duration and may correspond to a different frequency in an adaptive frequency hopping (AFH) hopping sequence. A BT HV3 frame is 1.25 ms in duration. Time slots may be set aside for wireless interface device 59 at regular intervals such as every sixth time slot or every third BT HV3 frame for transmission of BT HV3 packets from the host device 18-32. For example, a first packet may be transmitted from the host device 18-32 during time slot f(k) and a next packet may be transmitted from the host device during time slot f(k+6). Similarly, a first packet may be received by the host device 18-32 during time slot f(k+1) and a next packet may be received by the host device during time slot f(k+7). As a result, no Bluetooth communication occurs over a period of two BT HV3 frames providing a WLAN transmission window of 2.5 ms.

As shown, the TX_BT signal 305, such as the BT transmit signal 334, may be asserted during time slots f(k) and f(k+1) and during time slots f(k+6) and f(k+7) and provided via bus 154 to the wireless interface device 57 and particularly the processing module 150 as cooperation data to establish priority transmission for the BT HV3 packets. Asserting the TX_BT signal 305 may, for example, generally disable WLAN transmissions by the wireless interface device 57 for that 1.25 ms time interval time interval. The WLAN transmission window 307 illustrates an interval of time between assertions of the TX_BT signal 306 when the wireless interface device 57 may transmit WLAN packets. In this example, the wireless interface device 57 may transmit WLAN packets 306 and receive acknowledgement packets 308 during time slots f(k+2) through f(k+5) and during time slots f(k+8) through f(k+11) as shown. It should be noted that the timing and time duration of these packets can vary based on the packet size and based on the data rate that is employed and that these packets are not drawn to scale from a timing perspective and are meant, rather, to illustrate the juxtaposition of these packets with respect to each other and with respect to the BT and WLAN time interval set forth herein.

In the example presented above, BT HV3 packets are employed, however, when a BT wireless interface device 59 is implemented, other packet formats such as eSCO, A2DP, MP3, etc, could likewise be used in a similar fashion.

While the wireless interface schedule described above controls the timing of transmissions by the wireless interfaces devices 57 and 59, WLAN packets directed to wireless interface device could nevertheless be received from the base station or access point during the time interval allocated for a BT frame, for instance, WLAN packet 310 that is shown. If this packet is not acknowledged by wireless interface device 57, it will be retransmitted and could result in the lowering of the data rate.

In an embodiment of the present invention the wireless interface device 57 transmits an acknowledgement packet 312 at a reduced power level and/or reduced data rate during the BT time interval, such as the receive period shown. In particular, the power level of the transmission can be reduced from the power level used by the wireless interface device 57 during the WLAN time interval to reduce the interference between the transmission of the acknowledgement packet 312 by the wireless interface device 57 and possible contemporaneous reception by wireless interface device 59. The data rate of the transmission can also be reduced from the data rate to the lowest data rate allowed by the specification that governs communication or other data rate that is lower than the data rate used by the wireless interface device 57 during the WLAN time interval. This lowering of the data rate increases the probability that the acknowledgement packet 312 will be received by the base station or access point at the reduced power level and in the presence of possible BT interference.

In some instances, one or another of the wireless interface devices 57 or 59 may not be in operation and the host device may not need to operate in a coexistence mode that that allocates separate time intervals for use by these wireless interface devices. In these circumstances, the wireless interface schedule can be determined based on a use status of the wireless interface devices 57 and 59, allocating all of the time slots to the wireless interface device 57 if the wireless interface device 59 is not in use and allocating the all of the time slots to the wireless interface device 59 if the wireless interface device 57 is not in use.

In addition to the role played by priority information in the assignment of tasks from one wireless interface device to the other, priority information can be shared and used for cooperative and scheduling purposes. For instance, one or another of the wireless interface devices may set its own priority settings based on the tasks that the wireless interface desires to perform or is currently performing. For instance, the wireless interface device 57 may establish a priority setting that only grants permission to transmit to the wireless interface device 59 for high priority BT requests, that grants all requests, that grants medium and high priority request or that grants no requests. This allows one or another of the wireless interface devices (in this case the WLAN radio), to control potential conflict situations based on the priority of the activities that it wishes to accomplish and the activities that the other wireless interface device wishes to accomplish.

Figure 6:
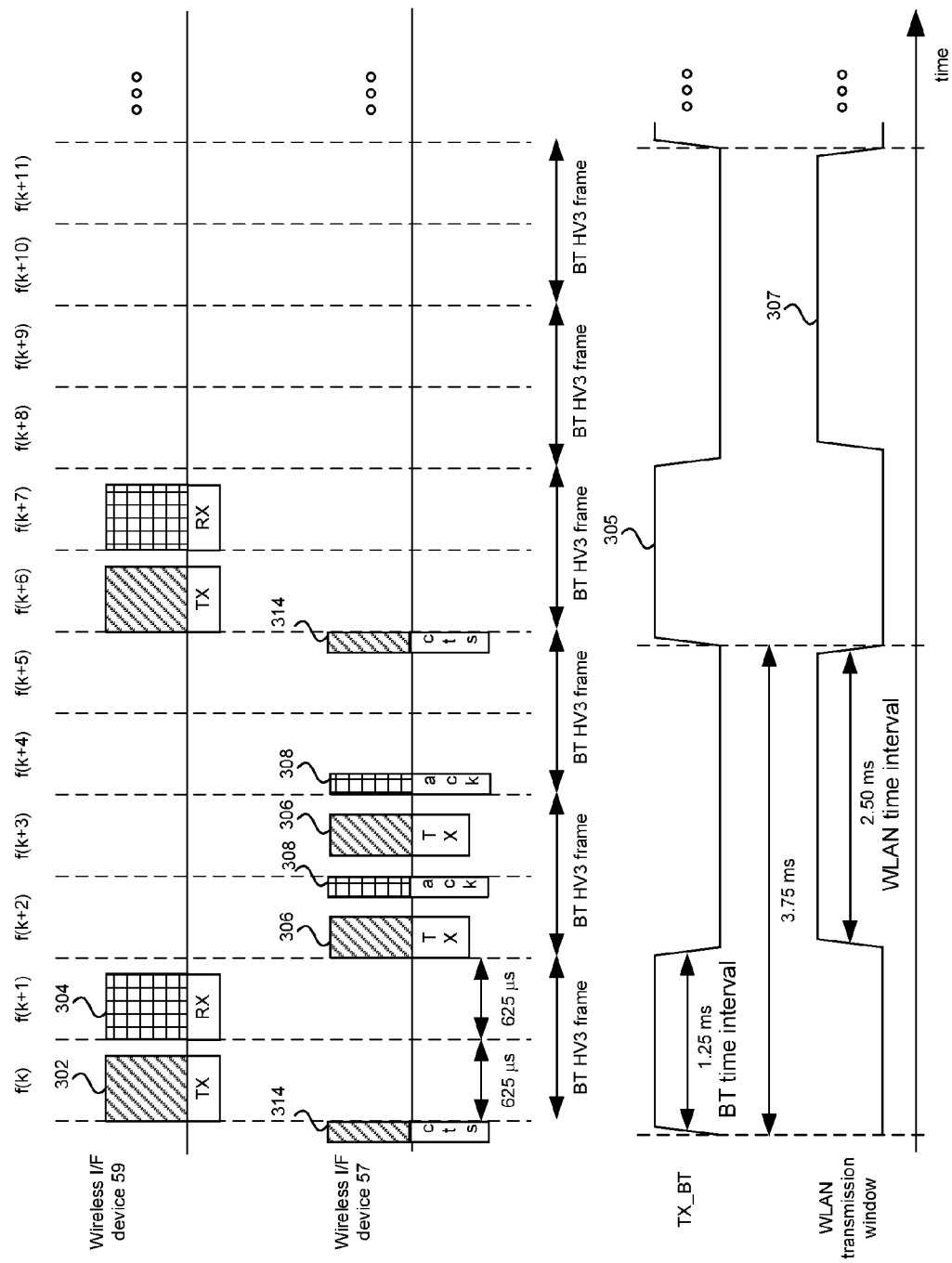
FIG. 6 is a timing diagram that illustrates an exemplary communication of BT HV3 frames and WLAN transmissions, in accordance with an embodiment of the invention.

FIG. 6 is a timing diagram that illustrates an exemplary communication of BT HV3 frames and WLAN transmissions, in accordance with an embodiment of the invention. In particular, one possible preemption mode is illustrated that uses a standard defined self clear to send feature to protect BT transmissions.

The IEEE 802.11 standard allows WLAN device to send CTS packets addressed to itself (CTS2SELF). These packets specify the duration field that is used by all WLAN nodes to update their network allocation vector (NAV) used in virtual carrier sense (CS) mechanism. If a collocated WLAN device sends a CTS2SELF packet addressed to itself just before Bluetooth activity slot with duration field set to be greater or equal to the duration of the upcoming Bluetooth transaction, then all WLAN traffic would be preempted during Bluetooth activity. This approach prevents the transmission of all WLAN traffic including beacons from any WLAN device. It does not require the WLAN AP to do any special queuing of the WLAN packets and is compatible with any AP implementation. This approach can also be used to delay beacon and multicast packet transmission until after a collocated Bluetooth device transaction. The drawback of this scheme is that the use of NAV to protect BT activity also denies the medium to all WLAN nodes. In a congested WLAN network just a few collocated WLAN/Bluetooth devices employing this method can significantly decrease WLAN throughput.

FIG. 6 demonstrates an example of the use of CTS2SELF scheme to protect a Bluetooth HV3 SCO link. The Bluetooth device (in this case, wireless interface device 59) informs the WLAN device (in this case wireless interface device 57) that there is a HV3 data transfer at the beginning of slot f(k), such as by asserting a Medium request 330. The WLAN device is informed via bus 154 about the duration of the upcoming HV3 traffic (which is 1.25 ms). The WLAN device then prepares the CTS2SELF frame 314 with the duration set to 1.25 ms and transmits it. A successful transmission of CTS2SELF frame 314 prevents any WLAN activity for 1.25 ms, enough for the Bluetooth to complete the transaction. The medium becomes free once the BT activity is over and WLAN devices can use the medium until the next Bluetooth slot (approximately 2.5 ms later). Then the entire cycle can be repeated.

Figure 7:
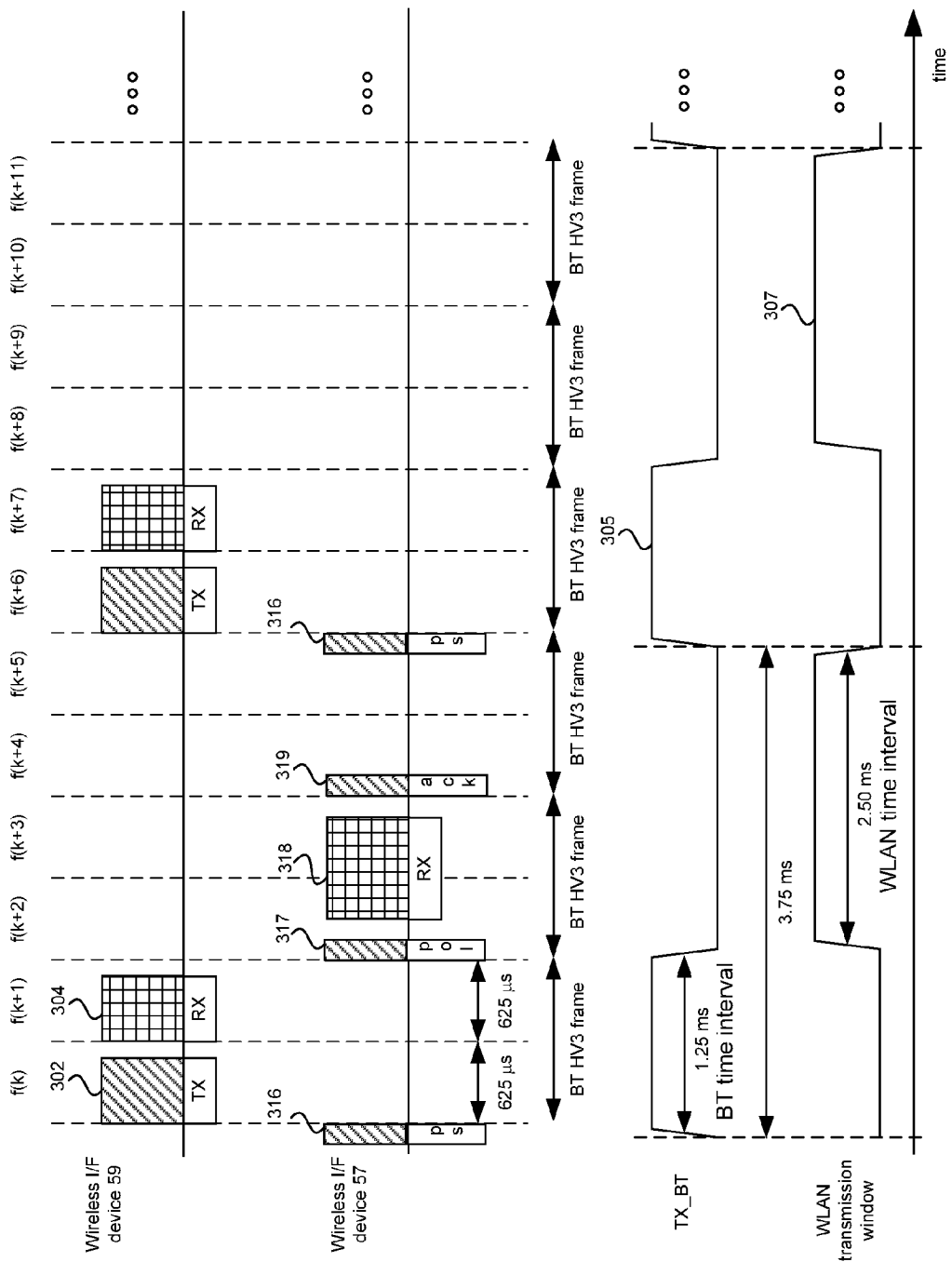
FIG. 7 is a timing diagram that illustrates an exemplary communication of BT HV3 frames and WLAN transmissions, in accordance with an embodiment of the invention.

FIG. 7 is a timing diagram that illustrates an exemplary communication of BT HV3 frames and WLAN transmissions, in accordance with an embodiment of the invention. In particular, another possible preemption mode is illustrated that uses a standard defined power save feature to protect BT transmissions.

IEEE 802.11 defines two different power states for the WLAN station (STA):
  Awake: STA is fully powered.
  Doze: STA is not able to transmit or receive.
And in turn, two power management modes:
  Active Mode (AM): STA may receive packets at any time
  Power Save Mode (PS): STA listens to selected beacons and polls AP for the packets if the most recent beacon indicates that AP has buffered traffic directed for that STA The WLAN STA informs the AP of the change in the Power Management mode through a frame exchange using a Power Management bit in the Frame Control field. When the WLAN device is in PS mode, the AP buffers all the traffic directed to that device until it either switches to Active Mode or polls for the buffered packets. The WLAN power management protocol can be used effectively to mitigate Bluetooth interference. The biggest advantage of this method is that does not inhibit other WLAN nodes from communicating and thus works well even in the congested WLAN environment. The main drawback is that the traffic buffering overhead in the WLAN AP can cause WLAN throughput degradation.

In the embodiment shown in FIG. 7, the collocated WLAN device transmits a frame 316 indicating to the access point that the WLAN device is entering PS mode. The WLAN device remains is PS mode indefinitely and uses PS-POLL frames 317 to poll the buffered data from the AP. The WLAN MAC transmits a PS-POLL frame, for instance when the medium request 330 is de-asserted, in expectation that the AP would send the buffered data before the start of the next Bluetooth transaction. As the type of Bluetooth traffic is available via bus 154 the WLAN knows the time of the next Bluetooth transaction and can determine if the AP would be able to respond before the next Bluetooth activity cycle. But since the AP response time for PS-POLL is not deterministic there is always a chance that the polled WLAN packet would collide with the Bluetooth transaction. Also the polling for every buffered packet significantly reduces the WLAN throughput. The advantages of this approach however is that no WLAN packet needs to be sent in the short period of time preceding Bluetooth transaction.

Several alternatives to this preemption mode exist. For instance, the collocated WLAN device can switch to AM after Bluetooth transaction is completed. The WLAN MAC can transmit a frame indicating PS mode when the medium request 330 is asserted and the frame indicating AM mode when the medium request 330 is de-asserted. The advantages of this scheme is that AP is positively inhibited from transmitting directed packets during Bluetooth transactions and no polling is required for retrieving buffered data, however power mode switching transactions take away from the available bandwidth even when there is no directed traffic available. In a further embodiment, a trigger frame can be used by the WLAN device to poll for all data frames buffered in the AP instead of individual polling using PS-POLL. This scheme is more efficient in medium utilization but has the higher risk of the polled train of packets transmitted by the AP colliding with the Bluetooth transaction.

In operation, a processing module, for instance the PTA of processing module 150 or 152 selectively preempts use of the frequency spectrum by an external device using a plurality of preemption modes including a first preemption mode and a second preemption mode. As discussed above, one preemption mode can preempt the use of the spectrum by an external device by transmitting packetized data to the second external device that includes a power save mode indication. A second preemption mode can preempt use of the spectrum by an external device by transmitting packetized data to the second external device that includes a self clear to send indication. Other preemption modes can be employed as well. The processing module is capable of switching between preemption modes based on observed or anticipated conditions in an attempt to increase throughput, reduce congestion, and/or prevent hogging of the channel by one of the wireless interface devices or the other or by an external device.

In an embodiment of the present invention, the processing module is further operable to monitor a throughput associated with the second wireless interface circuit, to compare the throughput to a throughput threshold, and to switch from the second preemption mode to the first preemption mode when the throughput compares unfavorably to the throughput threshold. For instance, while the CTS2SELF preemption mode can provide the best WLAN throughput, it can also inhibit all WLAN traffic during Bluetooth transaction. To avoid inefficient use of WLAN bandwidth, the processing module constantly monitors the throughput for the directed traffic. If the throughput falls below a threshold, the WLAN device can switch to the Power Save preemption mode. Further, the processing module 57 can be further operable to periodically switch from the first preemption mode to the second preemption mode and/or switch back from the first preemption mode to the second preemption mode. For instance, while in Power Save preemption mode, the WLAN device can periodically switch to CTS2SELF protection mode to check if the volume of the directed traffic justifies using CTS2SELF mode.

In an embodiment of the present invention, the processing module is further operable to determine when a third external device is using the second preemptive mode to limit the use of the second preemptive mode when the third external device is using the second preemptive mode. For instance, Power Save preemption mode can be set as the default. If the CTS2SELF preemption mode is employed by several devices in the same network, it may severely limit the network bandwidth. To prevent this from happening the collocated WLAN device can monitor the medium to determine if other devices are using CTS2SELF. The switch to CTS2SELF protection mode can be inhibited if the device determines that the considerable amount of bandwidth is already used by another device or devices using CTS2SELF.

Short of inhibiting CTS2SELF preemption mode, its use, or the use of other preemption modes can be limited by switching preemptive modes when a time in a particular preemptive mode is exceeded, allowing a back after a back-off period is satisfied. For instance, to prevent a single device from monopolizing the medium each WLAN device switches back to Power Save protection method after using CTS2SELF for a period of time. A congestion sense with random backoff (not to be confused with carrier sense) is used to determine when it can switch back to CTS2SELF method.

In an embodiment of the present invention, the processing module is further operable to use the first preemptive mode to protect a first type of packetized data transceived by the first wireless interface circuit and to use the second preemptive mode to protect a second type of packetized data transceived by the first wireless interface circuit. For instance, the CTS2SELF preemption mode may be limited to protect Bluetooth traffic of short duration. The page and inquiry scans can be protected by the Power Save preemption mode.

In an embodiment, the processing module is further operable to use the first preemptive mode to protect a first type of packetized data transceived by the second wireless interface circuit. For instance, when the WLAN STA is in Power Save preemption mode it is still expected to receive DTIM beacons and subsequent multicast traffic. If the collocated WLAN device is using Power Save protection, it can switch to CTS2SELF protection around DTIM beacon time to protect these WLAN transmissions.

As previously discussed, a data path, such as the bus 154 or other communication path can bidirectionally communicate cooperation data between the first wireless interface circuit and the second wireless interface circuit. In an embodiment of the present invention the cooperation data is communicated to prevent the first wireless interface circuit from interfering with a beacon interval of the second communication protocol. For instance, in a congested network with multiple collocated WLAN/Bluetooth devices, not all devices will have the opportunity to access the medium to send a CTS2SELF packet. If the device is unable to send a CTS2SELF packet to protect a Bluetooth transaction around a DTIM beacon interval it may deny Bluetooth medium access to the collocated wireless interface device, such as by denying a medium request 330, to prevent loosing the beacon.

In an embodiment of the present invention, the cooperation data includes priority data associated with at least one task and wherein the processing module is further operable to monitor a throughput associated with at least one of one of the first wireless interface circuit and the second wireless interface circuit, to compare the throughput to a throughput threshold and to modify the priority data associated with the at least one task when the throughput compares unfavorably to the throughput threshold. For instance, in cases where both WLAN device and Bluetooth device could occupy close to 100% of the available medium bandwidth (such is the case for the concurrent WLAN and Bluetooth ACL data connections) the respective bandwidth allocation is handled by multi-level priority communicated from Bluetooth to WLAN over bus 154. For a particular connection, both devices maintain the data throughput targets as well as minimum acceptable throughput requirements. As the Bluetooth traffic is being held back by the PTA not granting medium requests and its throughput falls below the target, the Bluetooth device can gradually increase its multi-level priority for the upcoming transaction opportunity. This priority is then compared with an equivalent WLAN multi-level priority to ensure fair bandwidth allocation.

Figure 8:
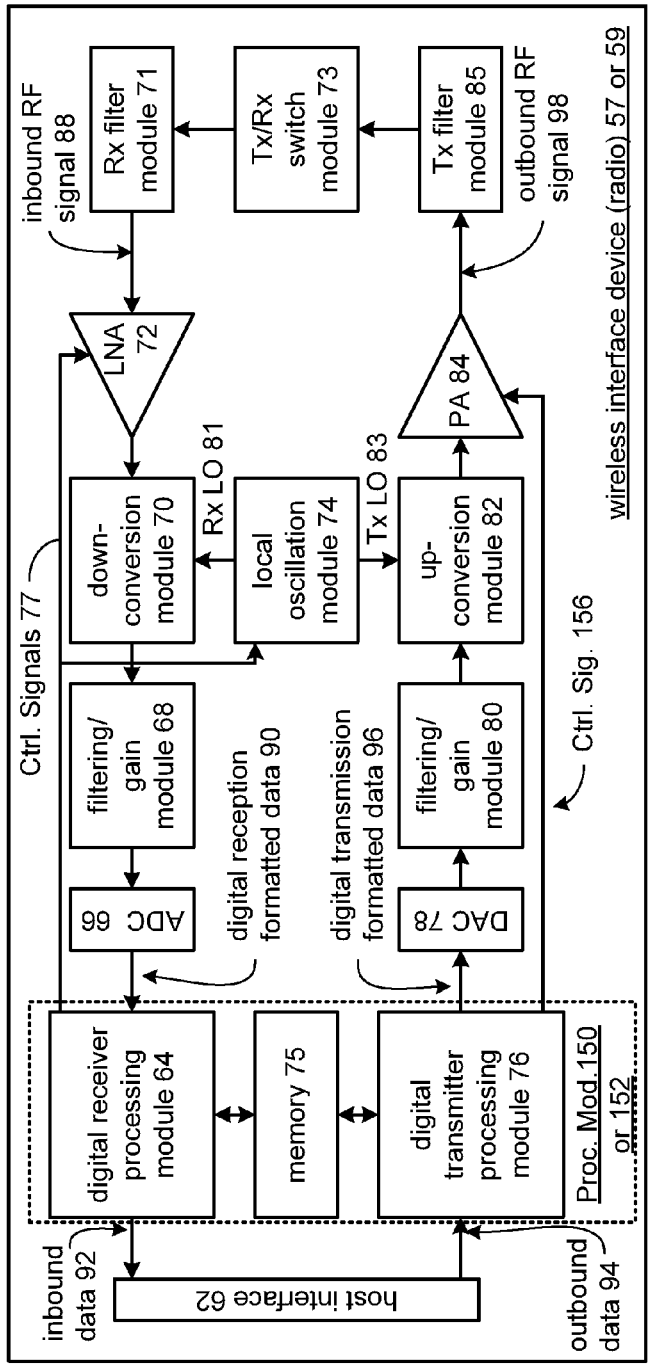
FIG. 8 is a schematic block diagram of a wireless interface device in accordance with an embodiment of the present invention.
Figure 9:
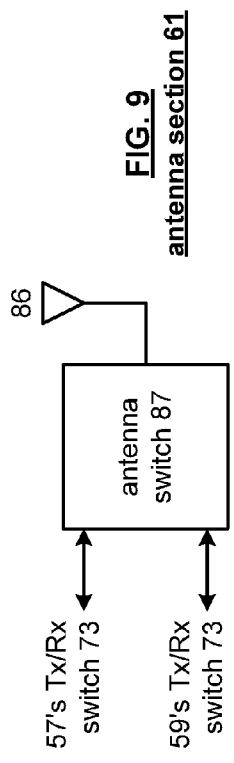
FIG. 9 is a schematic block diagram of an embodiment of an antenna section in accordance with the present invention.

FIG. 8 is a schematic block diagram of the wireless interface devices (i.e., a radio) 57 or 59, where each device includes a host interface 62, digital receiver processing module 64, an analog-to-digital converter (ADC) 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter (DAC) 78, a filtering/gain module 80, an IF mixing up conversion stage 82, a power amplifier 84, and a transmitter filter module 85. The transmitter/receiver switch 73 is coupled to the antenna section 61, which may include a shared antenna 86 and an antenna switch 87 (as shown in FIG. 9) that is shared by the two wireless interface devices and is further shared by the transmit and receive paths as regulated by the Tx/Rx switch 73. Alternatively, the antenna section 61 may include separate antennas for each wireless interface device, where the transmit path and receive path of each wireless interface device shares an antenna. Still further, the antenna section 61 may include a separate antenna for the transmit path and the receive path of each wireless interface device. As one of average skill in the art will appreciate, the antenna(s) may be polarized, directional, and be physically separated to provide a minimal amount of interference.

Returning to the discussion of FIG. 2, the digital receiver processing module 64 the digital transmitter processing module 76, and the memory 75 may be included in the processing module 150 or 152 and execute digital receiver functions and digital transmitter functions in accordance with a particular wireless communication standard. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the wireless interface device 57 or 59 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 including all current and future subsections, Bluetooth, etcetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna section 61 transmits the outbound RF signal 98 to a targeted device such as a base station, an access point, peripheral and/or another wireless communication device.

In an embodiment of the present invention, the digital transmitter processing module 76 generates a control signal 156 that adjusts the gain of the power amplifier 84 so that the output power of the outbound RF signal can be raised or lowered based on the signal path loss, transmission mode and further as discussed in conjunction with FIG. 3 when a packet is transmitted during a time interval of the other wireless interface device. It should be noted that, based on the implementation of the antenna switch 87, the gain of the power amplifier 84 may need to be further adjusted to compensate for the loss associated with the antenna switch 87. For instance, when the antenna switch is switched to provide coupling to wireless interface device 59 and wireless interface device needs to transmit, such as the acknowledgement packet discussed in conjunction with FIG. 3, an additional path loss of 20 dB or more may be induced by the switch being coupled to the other wireless interface device. This additional path loss should be considered in this implementation in determining the gain required of power amplifier 84 to produce the desired reduced power level transmission. Of course, in other implementations with dedicated antennas for each of the wireless interface devices 57 and 59, this additional loss could be eliminated.

The wireless interface device 57 or 59 also receives an inbound RF signal 88 via the antenna section 61, which was transmitted by a base station, an access point, or another wireless communication device. The antenna section 61 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by wireless interface device. The host interface 62 provides the recaptured inbound data 92 to the host device 18-32 via the radio interface 54.

While FIG. 8 shows the wireless interface devices 57 and 59 as being implemented with separate components, one or more modules or components of these devices can be implemented with shared components that operate for both wireless interface devices. For instance, a single LNA 72 and RX filter module 71 can be used by wireless interface devices 57 and 59 to filter and amplify inbound RF signals, a single reference oscillator, such as a crystal oscillator, can be used in local oscillation modules 74 of both wireless interface devices as the basis for generating separate local oscillation signals 81 and 83, etcetera. As discussed in conjunction with FIG. 2, the shared use of these devices can be coordinated to reduce power consumption, such as by scheduling concurrent use of these shared devices wherever possible, and by placing these devices in a low-power state when not in use. In particular, digital receiver processing module 64 generates control signals 77 to selectively switch shared modules, in this instance LNA 72 and local oscillation module 74 or portions thereof into a low-powered state when not in use. While control signals 77 are shown as being generated by digital receiver processing module 64, other processing modules of the host device could likewise be used for this purpose.

Figure 10:
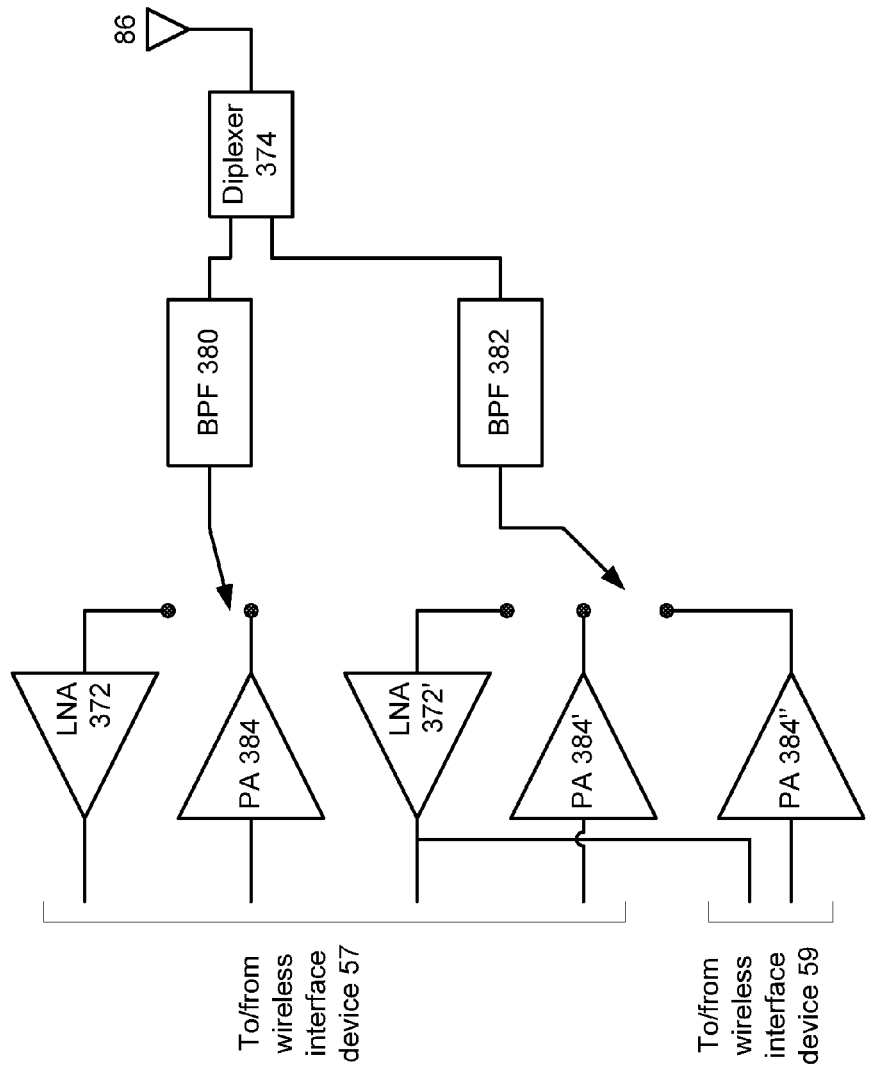
FIG. 10 is a schematic block diagram of an embodiment of an antenna section in accordance with the present invention.

FIG. 10 is a schematic block diagram of an embodiment of an antenna section in accordance with the present invention. In this embodiment, a WLAN device, such as wireless interface device 57 includes two power amplifiers 384 and 384' and two LNAs 372 and 372' for transmitting and receiving on two frequency bands. LNA 372', such as wireless interface device 59, that also includes its own power amplifier 384". Though not expressly shown, the gain of LNA 372' can be controlled to accommodate use in either of the two wireless interface device 57 or 59 via RF control 340. In addition, RF control 340 can be used to control the switches the couple the antenna 86, through diplexer 374 and bandpass filters 380 or 382 to the appropriate radio input or output.

Figure 11:
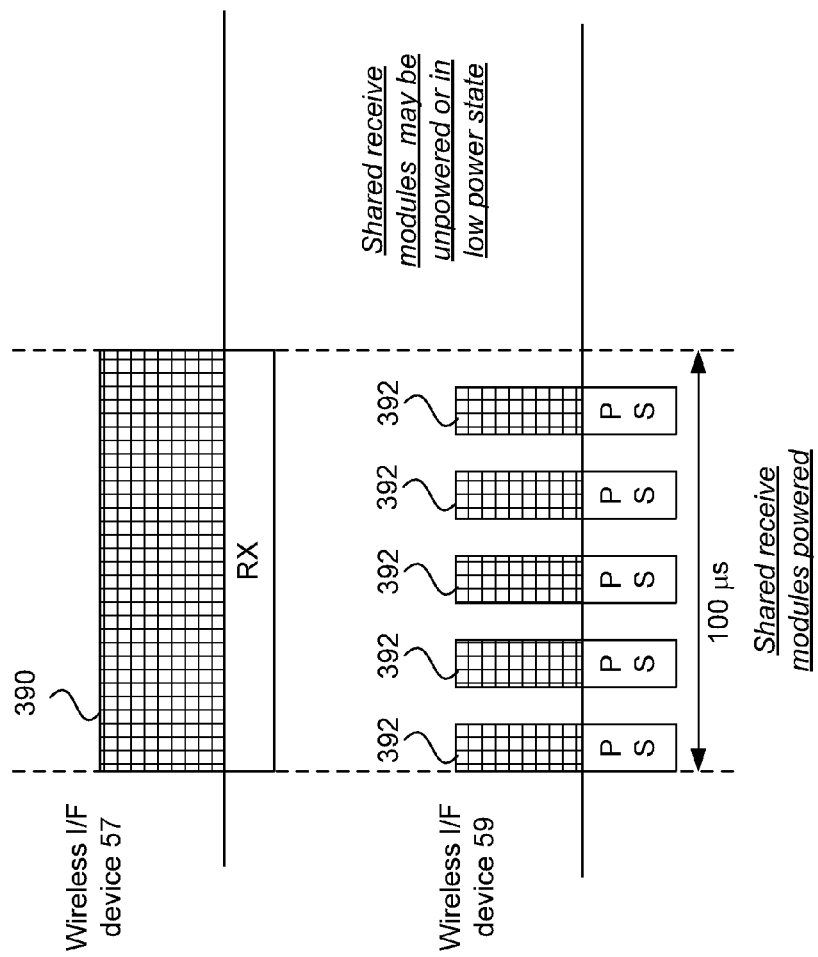
FIG. 11 is a timing diagram that illustrates an exemplary scheduling of BT page scans and a WLAN beacon window, in accordance with an embodiment of the invention.

FIG. 11 is a timing diagram that illustrates an exemplary scheduling of BT page scans and a WLAN beacon window, in accordance with an embodiment of the invention. In particular, a plurality of Bluetooth page scans 392 of wireless interface device 59 are scheduled during a 100 microsecond WLAN beacon window of wireless interface device 57. By performing these page scans during the period which wireless interface device is listening for a beacon from an access point, shared modules used in receiving such as LNA 72, local oscillator module 74 and/or other shared components can be used for both purposes while powered and potentially can be placed in an unpowered or other low-power state for longer period during other intervals of time reducing the power consumption of the host device. While this timing diagram illustrates the use of the present invention during a contemporaneous receive interval, the present invention can also be used to schedule contemporaneous use of shared modules in combined RX/TX modes, TX/TX modes and other modes of operation.

Figure 12:
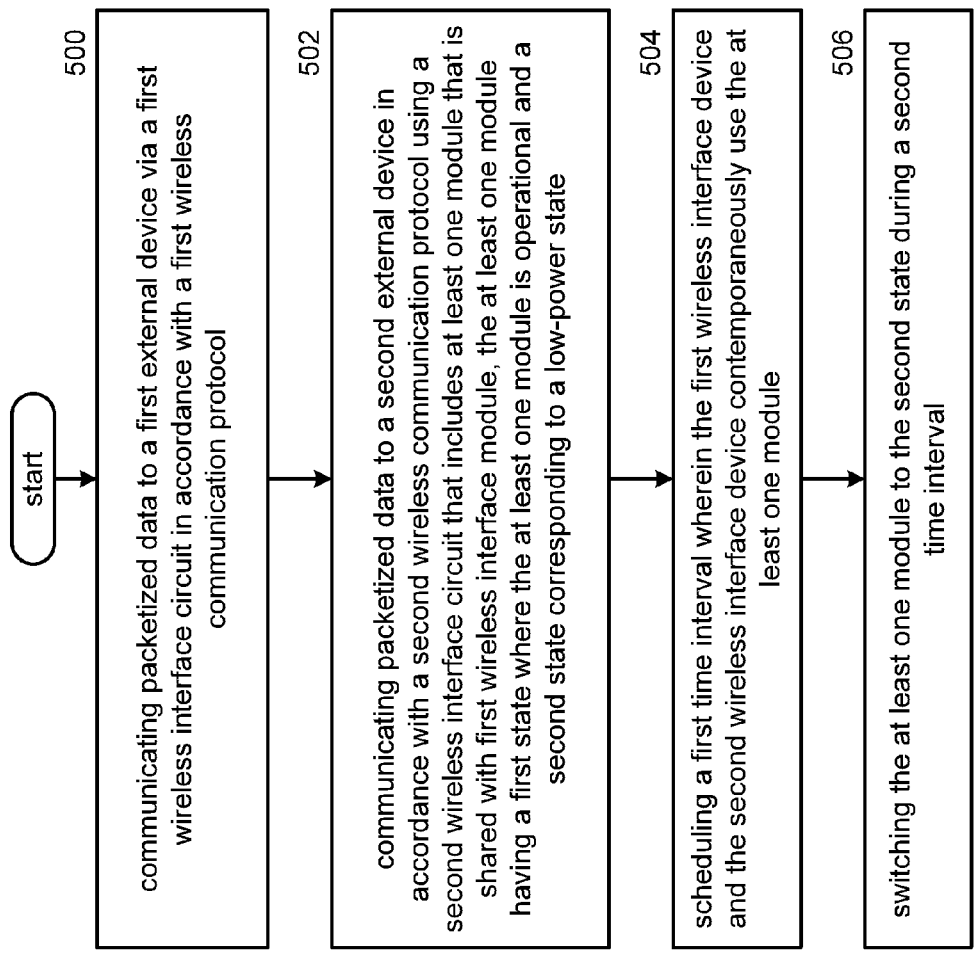
FIG. 12 is a flowchart representation of a method in accordance with an embodiment of the present invention.

FIG. 12 is a flowchart representation of a method in accordance with the present invention. In particular a method is presented for use in conjunction with one or more functions and features described in conjunction with FIGS. 1-11. In step 500, packetized data is transceived between a host module and a first external device in accordance with a first wireless communication protocol, using a first wireless interface circuit. In step 502, packetized data is transceived between the host module and a second external device in accordance with a second wireless communication protocol using a second wireless interface circuit that includes at least one module that is shared with first wireless interface module, the at least one module having a first state where the at least one module is operational and a second state corresponding to a low-power state. In step 504 a first time interval is scheduled wherein the first wireless interface device and the second wireless interface device contemporaneously use the at least one module. In step 506, the at least one module is switched to the second state during a second time interval.

In an embodiment of the present invention, the first wireless local area network protocol includes an 802.11 protocol, and the first wireless interface circuit scans for an incoming beacon during the first time interval. The second wireless local area network protocol can include a wireless pico-network protocol and the second wireless interface circuit can performs a page scan during the first time interval. The shared module can include an oscillator, a low noise amplifier and/or other shared module.

Figure 13:
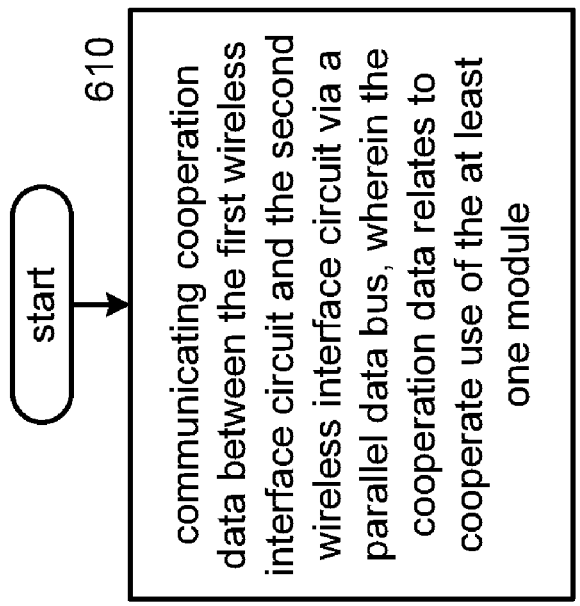
FIG. 13 is a flowchart representation of a method in accordance with an embodiment of the present invention.

FIG. 13 is a flowchart representation of a method in accordance with the present invention. In particular a method is presented for use in conjunction with one or more functions and features described in conjunction with FIG. 12. In step 510 cooperation data is bidirectionally communicated between the first wireless interface circuit and the second wireless interface circuit, wherein the cooperation data relates to cooperate use of the at least one module.

Figure 14:
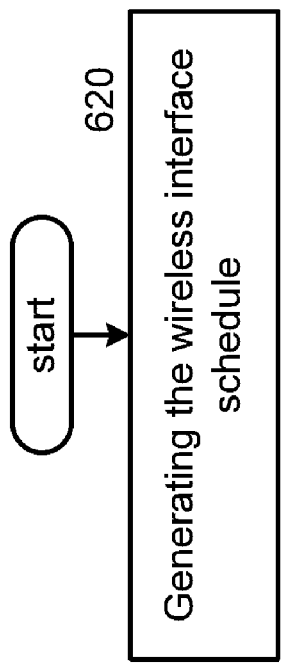
FIG. 14 is a flowchart representation of a method in accordance with an embodiment of the present invention.

FIG. 14 is a flowchart representation of a method in accordance with the present invention. In particular a method is presented for use in conjunction with one or more functions and features described in conjunction with FIGS. 12 and 13. In step 520, a wireless interface schedule is generated.

It should be noted that while the preceding description focuses on embodiments wherein two wireless interface circuits share the use of one or more modules, a communication device having three or more wireless interface circuits can share the use of one or more modules in a similar fashion. For example, active states of a low noise amplifier, crystal oscillator can be synchronized between BT, WLAN and Cellular (such as GSM) receivers when all three circuits are receiving, such as in standby modes of operation.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 of the wireless interface devices 57 and 59 may be implemented on a second integrated circuit, and the remaining components of the wireless interface devices 57 and 59, less the antennas 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The preceding discussion has presented a method and apparatus for cooperative transceiving between wireless interface devices of a host device. By enabling the wireless interface devices to communicate directly with each other, interference between them may be reduced and/or avoided. As one of average skill in the art will appreciate, other embodiments may be derived from the teachings of the present invention without deviating from the scope of the claims.

What is claimed is:

1. A circuit comprises:
    a first wireless interface circuit that communicates packetized data to a first external device in accordance with a first wireless communication protocol, wherein the first wireless protocol carries wireless telephony data for communication with a wireless telephony network;
    a second wireless interface circuit that communicates packetized data to a second external device in accordance with a second wireless communication protocol, wherein the second wireless interface circuit includes at least one module that is shared with first wireless interface circuit;
    a plurality of signal lines, coupled to the first wireless interface circuit and the second wireless interface circuit, that communicate cooperation data between the first wireless interface circuit and the second wireless interface circuit, wherein the cooperation data relates to cooperate use of the at least one module.

2. The circuit of claim 1 wherein the first wireless interface circuit and the second wireless interface circuit operate in accordance with a wireless interface schedule that includes a first time interval wherein the first wireless interface device and the second wireless interface device contemporaneously use the at least one module.

3. The circuit of claim 2 wherein the first wireless communication protocol includes an 802.11 protocol, and wherein the first wireless interface circuit scans for an incoming beacon during the first time interval.

4. The circuit of claim 2 wherein the second wireless communication protocol includes a wireless pico-network protocol and the second wireless interface circuit performs a page scan during the first time interval.

5. The circuit of claim 1 further comprising:
    a processing module, coupled to the first wireless interface device and the second wireless interface device, that generates the wireless interface schedule.

6. The circuit of claim 1 wherein the at least one module includes at least one of, an oscillator, and a low noise amplifier.

7. The circuit of claim 1 wherein the at least one module is powered off during a second time interval.

8. The circuit of claim 1 wherein the first wireless communication protocol includes one of: a global system for mobile communications protocol, a general packet radio service protocol, an enhanced data rates for global evolution protocol, and a universal mobile telecommunication system protocol.

9. A method comprising:
    communicating packetized data to a first external device in accordance with a first wireless communication protocol, using a first wireless interface circuit, wherein the first wireless protocol carries wireless telephony data for communication with a wireless telephony network;
    communicating packetized data to a second external device in accordance with a second wireless communication protocol using a second wireless interface circuit that includes at least one module that is shared with first wireless interface module; and
    scheduling a first time interval wherein the first wireless interface device and the second wireless interface device contemporaneously use the at least one module.

10. The method of claim 9 wherein the first wireless communication protocol includes an 802.11 protocol, and wherein the first wireless interface circuit scans for an incoming beacon during the first time interval.

11. The method of claim 9 wherein the second wireless communication protocol includes a wireless pico-network protocol and the second wireless interface circuit performs a page scan during the first time interval.

12. The method of claim 9 wherein the at least one module includes at least one of, an oscillator, and a low noise amplifier.

13. The method of claim 9 further comprising:
    communicating cooperation data between the first wireless interface circuit and the second wireless interface circuit, wherein the cooperation data relates to cooperate use of the at least one module.

14. The method of claim 9 further comprising:
    generating the wireless interface schedule.

15. The method of claim 9 wherein the at least one module has a first state where the at least one module is operational and a second state corresponding to a low-power state, and wherein the method further comprises:
    switching the at least one module to the second state during a second time interval.

16. The method of claim 9 wherein the first wireless communication protocol includes one of: a global system for mobile communications protocol, a general packet radio service protocol, an enhanced data rates for global evolution protocol, and a universal mobile telecommunication system protocol.

* * * * *